United States Patent
Li

(10) Patent No.: US 10,996,684 B2
(45) Date of Patent: May 4, 2021

(54) METHOD, DEVICE AND SYSTEM FOR CONTROLLING UAV

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Ying Li, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 233 days.

(21) Appl. No.: 16/334,534

(22) PCT Filed: Jul. 14, 2017

(86) PCT No.: PCT/CN2017/093013
§ 371 (c)(1),
(2) Date: Mar. 19, 2019

(87) PCT Pub. No.: WO2018/054146
PCT Pub. Date: Mar. 29, 2018

(65) Prior Publication Data
US 2020/0301450 A1    Sep. 24, 2020

(30) Foreign Application Priority Data

Sep. 23, 2016  (CN) .......................... 201610846946.9

(51) Int. Cl.
*H04W 4/00*      (2018.01)
*G05D 1/10*      (2006.01)
(Continued)

(52) U.S. Cl.
CPC ............. *G05D 1/104* (2013.01); *G05D 1/102* (2013.01); *H04L 67/12* (2013.01); *H04L 67/303* (2013.01); *H04W 4/08* (2013.01)

(58) Field of Classification Search
CPC ...... G05D 1/104; G05D 1/102; G05D 1/0027; H04L 67/12; H04L 67/303; H04W 4/08;
(Continued)

(56) References Cited

U.S. PATENT DOCUMENTS 9,170,117 B1 * 10/2015 Abuelsaad ............. G01C 21/34
9,626,874 B1 *  4/2017 Gupta .................. G08G 5/0069
(Continued)

FOREIGN PATENT DOCUMENTS

CN      102768518 A     11/2012
CN      103839194 A  *   6/2014
(Continued)

OTHER PUBLICATIONS

International Search Report dated Oct. 12, 2017 in PCT/CN2017/093013 (with English translation), 14 pages.
(Continued)

*Primary Examiner* — Mahendra R Patel
(74) *Attorney, Agent, or Firm* — Oblon, McClelland, Maier & Neustadt, L.L.P.

(57) ABSTRACT

The present disclosure discloses a method, apparatus and system for controlling UAV, which relates to the field of unmanned aerial vehicles (UAV). The method includes: receiving one or more UAV control instructions sent by a ground station device, and each UAV control instruction includes a variable identification for identifying an UAV; for each of the UAV control instructions, acquiring an address identification of the corresponding UAV according to the variable identification in the UAV control instruction, and sending the corresponding UAV control instruction to a
(Continued)

communication module of the UAV corresponding to the address identification via a mobile network, so that the UAV executes an operation corresponding to the received UAV control instruction, and the communication module of the UAV includes the address identification of the UAV.

13 Claims, 5 Drawing Sheets

(51) Int. Cl.
    *H04L 29/08*     (2006.01)
    *H04W 4/08*     (2009.01)

(58) Field of Classification Search
    CPC ...... H04W 4/40; H04W 4/024; B64C 39/024; Y02P 90/02; G05B 19/4185; G08G 5/0069; G08G 5/0026; B60R 25/104; G08B 25/009
    USPC .......................................................... 370/329
    See application file for complete search history.

(56) References Cited

U.S. PATENT DOCUMENTS

| | | | | |
|---|---|---|---|---|
| 9,847,033 | B1* | 12/2017 | Carmack | G01S 19/215 |
| 9,870,566 | B2* | 1/2018 | Gong | G08G 5/0091 |
| 10,089,888 | B2* | 10/2018 | Priest | G08G 5/0013 |
| 2013/0054054 | A1* | 2/2013 | Tollenaere | G05D 1/0858 |
| | | | | 701/3 |
| 2014/0018976 | A1* | 1/2014 | Goossen | G05D 1/0022 |
| | | | | 701/2 |
| 2014/0071274 | A1* | 3/2014 | Golden | G07C 9/00912 |
| | | | | 348/143 |
| 2016/0169772 | A1* | 6/2016 | Olmedo | G01N 1/08 |
| | | | | 73/864.32 |
| 2017/0039861 | A1* | 2/2017 | Ceribelli | G08G 5/0069 |
| 2017/0075360 | A1* | 3/2017 | Von Novak | B64C 27/08 |
| 2017/0183074 | A1* | 6/2017 | Hutson | B64C 1/061 |
| 2017/0219685 | A1* | 8/2017 | Chikkappa | G01S 5/186 |
| 2017/0228692 | A1* | 8/2017 | Pargoe | B65D 43/16 |
| 2017/0234724 | A1* | 8/2017 | Naguib | G01H 3/08 |
| | | | | 367/117 |
| 2017/0358224 | A1* | 12/2017 | Priest | G08G 5/0069 |
| 2017/0364065 | A1* | 12/2017 | Petruzzelli | G08G 5/0069 |
| 2018/0253092 | A1* | 9/2018 | Trapero Esteban | H04W 12/06 |

FOREIGN PATENT DOCUMENTS

| | | | |
|---|---|---|---|
| CN | 104615143 | A | 5/2015 |
| CN | 204669614 | U | 9/2015 |
| CN | 204859417 | U | 12/2015 |
| CN | 105573336 | A | 5/2016 |
| CN | 105739516 | A | 7/2016 |
| CN | 105761550 | A * | 7/2016 |
| CN | 105807788 | A | 7/2016 |
| CN | 105913604 | A * | 8/2016 |
| CN | 106412046 | A | 2/2017 |

OTHER PUBLICATIONS

Combined Chinese Office Action and Search Report dated Oct. 22, 2018 in Patent Application No. 201610846946.9 (with English translation of Categories of Cited Documents), 9 pages.
Huang Huayuan, "Data Link Technology of One—Station Controlling Multiple UAVs" Telecommunication Engineering, vol. 55, No. 8, Aug., 2015, pp. 879-884 (with English Abstract).

* cited by examiner

METHOD, DEVICE AND SYSTEM FOR CONTROLLING UAV

CROSS-REFERENCE TO RELATED APPLICATION

The present disclosure is based on and claims priority to Chinese Patent Application No. 201610846946.9, filed on Sep. 23, 2016, and the entire contents of this application are hereby incorporated herein by reference in entirety.

FIELD OF THE DISCLOSURE

The present disclosure relates to the field of unmanned aerial vehicles (UAV), in particular to a method, device and system for controlling UAV.

BACKGROUND

With the development of new aviation control, communication, information processing, sensors, navigation and other related technologies, real-time monitoring of flight data and flight attitude control of UAVs can be carried out by ground control systems. In addition, waypoint mapping and autonomous flight route planning can also be realized.

DISCLOSURE OF THE DISCLOSURE

According to one aspect of the present disclosure, a method for controlling UAV is provided, comprising: receiving, by a server, one or more UAV control instructions sent by a ground station device, wherein each UAV control instruction comprises a variable identification for identifying an UAV; and acquiring, by the server, for each of the UAV control instructions, an address identification of the corresponding UAV according to the variable identification in the UAV control instruction, and sending the corresponding UAV control instruction to a communication module of the UAV corresponding to the address identification via a mobile network, so that the UAV executes an operation corresponding to the received UAV control instruction.

Further, the method further comprises: receiving, by the server, UAV data sent by the communication module of each UAV via the mobile network, wherein the UAV data comprises the variable identification for identifying the UAV; sending, by the server, the UAV data to the ground station device, so that the ground station device identifies the UAV data according to the variable identification.

Further, the method further comprises: sending, by the server, the UAV data to the ground station device, so that the ground station device collectively displays the UAV data using a display device.

Further, the mobile network is a 3G network and/or 4G network; receiving, by the server, UAV data sent by the communication module of each UAV via the mobile network comprises: receiving, via the Internet by the server, the UAV data sent by the communication module of each UAV via the 3G network and/or 4G network, wherein the communication module of the UAV converts serial port data of the UAV into UAV data transmitted via 3G network and/or 4G network.

Further, the method further comprises: saving, by the server, a correspondence between the variable identification and the address identification of each UAV, so as to acquire corresponding address identification according to each variable identification when receiving a plurality of UAV control instructions, and send the plurality of UAV control instructions respectively to the communication module of UAV corresponding to each address identification.

According to another aspect of the present disclosure, there is also provided a server, comprising: memory; and a processor coupled to the memory, the processor configured to perform the method for controlling UAV for performing operations based on instructions stored in the memory, comprising: receiving one or more UAV control instructions sent by a ground station device, wherein each UAV control instruction comprises a variable identification for identifying an UAV; and for each of the UAV control instructions, acquiring an address identification of the corresponding UAV according to the variable identification in the UAV control instruction, and sending the corresponding UAV control instruction to a communication module of the UAV corresponding to the address identification via a mobile network, so that the UAV executes an operation corresponding to the received UAV control instruction.

Further, the operations further comprise: receiving UAV data sent by the communication module of each UAV via the mobile network, wherein the UAV data comprises the variable identification for identifying the UAV; sending the UAV data to the ground station device, so that the ground station device identifies the UAV data according to the variable identification.

Further, the operations further comprise: sending the UAV data to the ground station device, so that the ground station device collectively displays the UAV data using a display device.

Further, the mobile network is a 3G network and/or 4G network; receiving the UAV data sent by the communication module of each UAV via the 3G network and/or 4G network, wherein the communication module of the UAV converts serial port data of the UAV into UAV data transmitted via 3G network and/or 4G network.

Further, the operations further comprise: saving a correspondence between the variable identification and the address identification of each UAV, so as to acquire corresponding address identification according to each variable identification when receiving a plurality of UAV control instructions, and send the plurality of UAV control instructions respectively to the communication module of UAV corresponding to each address identification.

According to another aspect of the present disclosure, there is also provided a unmanned aerial vehicle (UAV), comprising: memory; and a processor coupled to the memory, which is configured to execute the method for controlling UAV for performing operations on a basis of instructions stored in the memory, comprising: receiving an UAV control instruction sent by a server via a mobile network, wherein the UAV control instruction comprises a variable identification for identifying the UAV, the server acquires an address identification of the corresponding UAV according to the variable identification, and sends the UAV control instruction according to the address identification of the UAV; and executing an operation corresponding to the UAV control instruction.

Further, the operations further comprise: sending UAV data to the server via the mobile network, so that the server sends UAV data to a ground station device, wherein the UAV data comprises a variable identification for identifying the UAV.

Further, the operations further comprise: converting serial port data of the UAV into UAV data transmitted via 3G network and/or 4G network, and sending the UAV data to the server via a 3G network and/or 4G network.

According to another aspect of the present disclosure, there is also provided a system for controlling UAV, comprising: the server; the UAVs; and a ground station device for sending one or more UAV control instructions to the server.

Further, the ground station device is used for receiving UAV data sent by the server.

Further, the ground station device is used for collectively displaying the UAV data.

According to another aspect of the present disclosure, there is also provided a computer readable storage medium having stored thereon computer program instructions which, when executed by a processor, implement the steps of the above method.

Further, receiving UAV data sent by the communication module of each UAV via the mobile network, wherein the UAV data comprises the variable identification for identifying the UAV; sending the UAV data to the ground station device, so that the ground station device identifies the UAV data according to the variable identification.

Further, the mobile network is a 3G network and/or 4G network; receiving the UAV data sent by the communication module of each UAV via the 3G network and/or 4G network, wherein the communication module of the UAV converts serial port data of the UAV into UAV data transmitted via 3G network and/or 4G network.

Further, saving a correspondence between the variable identification and the address identification of each UAV, so as to acquire corresponding address identification according to each variable identification when receiving a plurality of UAV control instructions, and send the plurality of UAV control instructions respectively to the communication module of UAV corresponding to each address identification.

Other features and advantages of the present disclosure will become apparent from the following detailed description of exemplary embodiments of the present disclosure with reference to the accompanying drawings.

DESCRIPTION OF THE DRAWINGS

The accompanying drawings, which are incorporated in and constitute a part of this specification, illustrate embodiments of the disclosure and, together with the description, serve to explain the principles of the disclosure.

The present disclosure will be more clearly understood from the following detailed description with reference to the accompanying drawings, in which.

DETAILED DESCRIPTION

Figure 1:
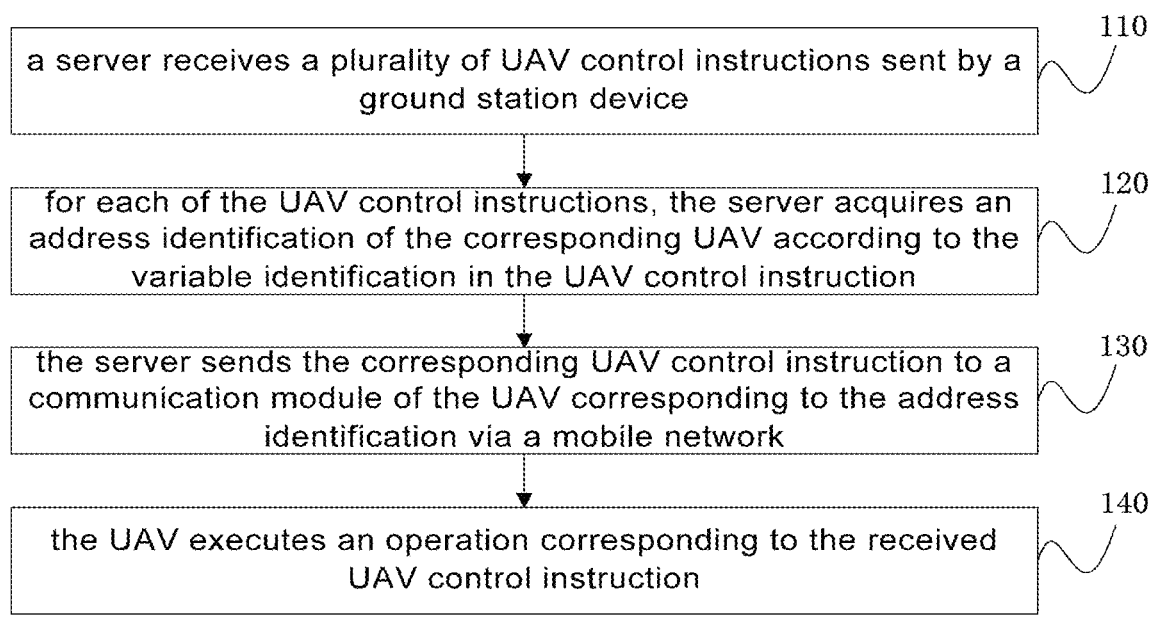
FIG. 1 is a schematic flow chart of a method for controlling UAV according to some embodiments of the present disclosure.

Various exemplary embodiments of the present disclosure will now be described in detail with reference to the accompanying drawings. Notice that, unless otherwise specified, the relative arrangement, numerical expressions and numerical values of the components and steps set forth in these examples do not limit the scope of the disclosure.

At the same time, it should be understood that, for ease of description, the dimensions of the various parts shown in the drawings are not drawn to actual proportions.

The following description of at least one exemplary embodiment is in fact merely illustrative and is in no way intended as an limitation to the disclosure, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

For a clear understanding of the object of the present disclosure, its technical solution and advantages, the present disclosure will be further described in detail below in conjunction with the accompanying drawings and embodiments.

Most UAVs and ground control systems in the industry are in a stand-alone mode, i.e., one ground station can only control one UAV. Multiple ground stations are required to control multiple UAVs respectively when the multiple UAVs fly, thus flexible and cooperative control functions cannot be realized. In addition, most of the communications between ground control systems and UAVs adopt data radio or wireless router relay processing, so the data transmission range is limited, as a result, communication link interruption and other problems often occur in the situation of over-the-horizon flight of UAVs.

FIG. 1 is a schematic flow chart of a method for controlling UAV according to some embodiments of the present disclosure. The method for controlling UAV comprises the following steps.

At step 110, a server receives a plurality of UAV control instructions sent by a ground station device. Wherein, each UAV control instruction carries a variable identification for identifying an UAV. For example, the ground station device uses a self-defined protocol when communicating with an UAV. A sisId field of the self-defined protocol data packet is an 8-bit variable identification used to identify the model of the UAV.

At step 120, for each of the UAV control instructions, the server acquires an address identification of the corresponding UAV according to the variable identification in the UAV control instruction. Wherein, an IP address of the server can be bound in a communication module of the UAV. After each UAV sends its own data to the server, the server can acquire the address identification (source address) and the variable identification of the UAV. When the server receives an UAV control instruction sent by the ground station device, an address identification of the UAV can be acquired according to the variable identification carried in the instruction, wherein the source address of the UAV can be an IP address.

At step 130, the server sends the corresponding UAV control instruction to a communication module of the UAV corresponding to the address identification via a mobile network. For example, the server sends the control instruction of UAV 1 to the 3G communication module of UAV 1 via a 3G network according to the address identification of UAV 1, wherein the address identification of UAV 1 is set in the 3G communication module of UAV 1. Those skilled in the art should understand that the 3G network is only used for example. With the development of 4G, 5G networks, a 4G, 5G or another next generation network can also be used for communication.

At step 140, the UAV executes an operation corresponding to the received UAV control instruction. Each UAV receives different instructions and can perform different operations. For example, UAV 1 hovers in the air after receiving a hovering instruction; UAV 2 executes a descending operation after receiving a descending instruction; UAV 3 executes an ascending operation after receiving an ascending instruction.

In this embodiment, the server receives a plurality of UAV control instructions sent by a ground station device, acquires an address identification of UAV according to the variable identification in the UAV control instruction, and sends the corresponding UAV control instruction to a communication module of the UAV corresponding to the address identification via a mobile network, so that the UAV executes an operation corresponding to the UAV control instruction, and thus multiple UAVs being controlled by one ground station device can be achieved.

Figure 2:
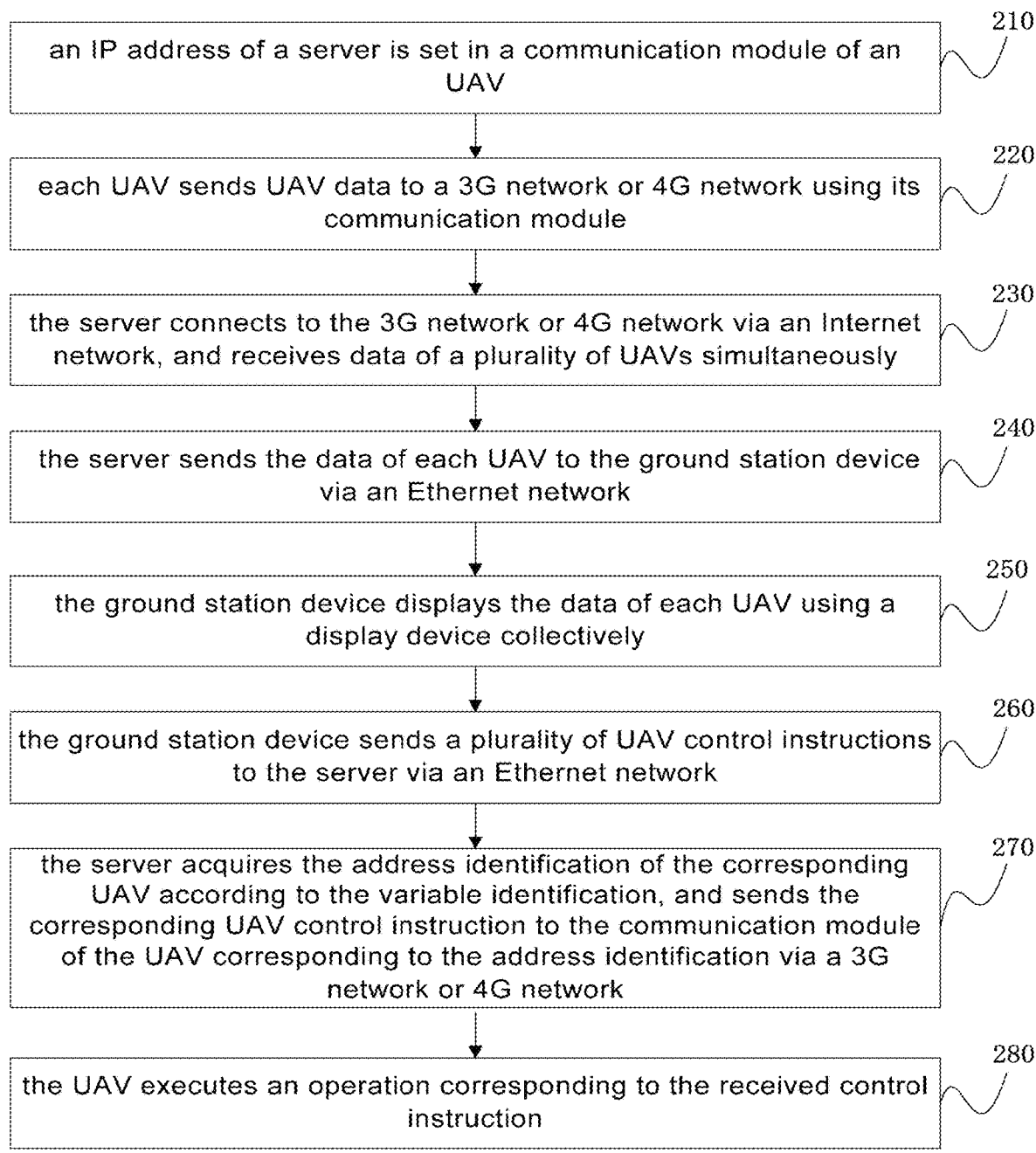
FIG. 2 is a schematic flow chart of a method for controlling UAV according to some other embodiments of the present disclosure.

FIG. 2 is a schematic flow chart of a method for controlling UAV according to some other embodiments of the present disclosure. The method for controlling UAV comprises the following steps.

At step 210, an IP address of a server is set in a communication module of an UAV. For example, a PC is used to connect to a 3G network or 4G network, then a website such as 192.168.1.1 is visited to configure an IP and a port of the server, and the IP address of the network is bound in the communication module.

At step 220, each UAV sends UAV data to a 3G network or 4G network using its communication module, wherein if the mobile network is a 3G network, the communication module is a 3G communication module, and if the mobile network is a 4G network, the communication module is a 4G communication module. The UAV data comprises an 8-bit variable identification, and different UAVs can be identified according to their variable identifications. For example, in this embodiment, UAVs communicate with a ground station device using a self-defined protocol, wherein a self-defined protocol data packet may comprise a STX field, a LEN field, a MANUID field, a SISID field, a MSGID field, a PAYLOAD field, a CKA and a CKB fields. The meanings of these fields are shown in Table 1.

TABLE 1

| Field | length | description |
|---|---|---|
| STX | 8 bit | Start flag bit |
| LEN | 8 bits (0-255) | Byte length of Payload |

TABLE 1-continued

| Field | length | description |
|---|---|---|
| MANUID | 8 bits (0-255) | Vendor ID, used to distinguish different flight control vendors 0-100: Manufacturer ID, mainly used for expansion |
| SYSID | 8 bits (0-255) | System number of the same manufacturer, used to identify different UAVs |
| MSGID | 8 bits (0-255) | Number of a message packet in the payload |
| PAYLOAD | 0-255 bytes | Variable length payload |
| CKA, CKB | 16 bits | 16-bit check code |
| ... | ... | ... |

The UAV data may be UAV flight data, flight attitude and other data, and the communication module can convert serial port data of the UAV into data that can be transmitted via the 3G network or 4G network.

At step 230, the server connects to the 3G network or 4G network via an Internet network, and receives data of a plurality of UAVs simultaneously. Since the UAV communication module is provided with an IP address of the server, the UAV can accurately send data to the server. The server can be aware of the address identification (source address) of the UAV, and thus save a correspondence between the address identification and the variable identification of each UAV.

At step 240, the server sends the data of each UAV to the ground station device via an Ethernet network.

At step 250, the ground station device displays the data of each UAV using a display device collectively. For example, by means of ground station software, flight data and flight trajectories of a plurality of UAVs can be seen at the same time, so that the data can be monitored in real time by managers.

At step 260, the ground station device sends a plurality of UAV control instructions to the server via an Ethernet network, wherein the UAV control instruction comprises a variable identification.

At step 270, for each of the UAV control instructions, the server acquires the address identification of the corresponding UAV according to the variable identification in the UAV control instruction, and sends the corresponding UAV control instruction to the communication module of the UAV corresponding to the address identification via a 3G network or 4G network.

At step 280, the UAV executes an operation corresponding to the received control instruction.

In this embodiment, the ground station device sends a plurality of control instructions to the server. The server sends each control instruction to a corresponding UAV according to its variable identification. The UAV can perform an operation corresponding to the control instruction. Thus, multiple UAVs being controlled by one ground station device can be achieved. Further, based on a self-defined protocol, the ground station device communicates with the server via an Ethernet network. The server communicates with UAVs via a 3G network, so that the UAVs can be controlled by the ground station device in the situation of over-the-horizon flight. Further, since an Ethernet network can be accessed by UAVs through the server, it lays a foundation for the close connection between the UAV industry and the Internet industry.

Figure 3:
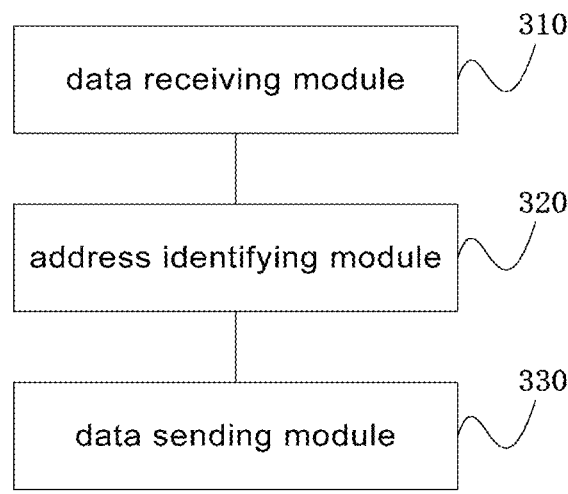
FIG. 3 is a schematic structural diagram of a server according to some embodiments of the present disclosure.

FIG. 3 is a schematic structural diagram of a server according to some embodiments of the present disclosure.

The server comprises a data receiving module 310, an address identifying module 320, and a data sending module 330. Wherein, the data receiving module 310 is used for receiving one or more UAV control instructions sent by a ground station device. For example, it receives a plurality of UAV control instructions sent by a ground station device via an Ethernet network. Wherein, each UAV control instruction carries a variable identification for identifying an UAV. For example, the ground station device uses a self-defined protocol when communicating with an UAV. A sisId field of the self-defined protocol data packet is an 8-bit variable identification used to identify the model of the UAV.

The address identifying module 320 is used for acquiring an address identification of the corresponding UAV according to the variable identification in the UAV control instruction for each of the UAV control instructions. Wherein, an IP address of the server can be bound in a communication module of the UAV. After each UAV sends its own data to the server, the server can acquire the address identification (source address) and the variable identification of the UAV. When the server receives an UAV control instruction sent by the ground station device, an address identification of the UAV can be acquired according to the variable identification carried in the instruction.

The data sending module 330 is used for sending the corresponding UAV control instruction to a communication module of the UAV corresponding to the address identification via a mobile network, so that the UAV can perform an operation corresponding to the received UAV control instruction. For example, the data sending module 330 sends UAV control instruction 1 to the 3G communication module of UAV 1 via a 3G network according to the address identification of UAV 1, wherein the address identification of UAV 1 is set in the 3G communication module of UAV 1. Each UAV receives different instructions, and thus can perform different operations.

In this embodiment, the server can realize forwarding of data of multiple UAVs, storage of data of multiple UAVs, parsing of some data, etc. For example, the server receives a plurality of UAV control instructions sent by a ground station device, acquires the address identification of the UAV according to the variable identification in the UAV control instruction, and sends the corresponding UAV control instruction to the communication module of the UAV corresponding to the address identification via a mobile network, so that each UAV can perform an operation according to the UAV control instruction, and thus multiple UAVs being controlled by one ground station device can be achieved.

In some embodiments of the present disclosure, the data receiving module 310 is further used for receiving UAV data sent by the communication module of an UAV via a mobile network. For example, the communication module is a 3G communication module, and an IP address of the server can be set in the 3G communication module of the UAV in advance. If the communication module is a 4G communication module, an IP address of the server can be set in the 4G communication module of the UAV. Each UAV sends UAV data to a 3G network or 4G network using its communication module. The server is connected to the 3G network or 4G network via an Internet network, and receives data of a plurality of UAVs simultaneously. Since the UAV communication module is provided with an IP address of the server, the UAV can send data to the server accurately.

The address identifying module 320 is further used for saving a correspondence between the variable identification and the address identification of each UAV, so as to identify the address identification according to the variable identification contained in each of UAV control instructions when receiving a plurality of UAV control instructions sent by a ground station device. Wherein, according to data sent by each UAV, the server may be aware of the address identification of the UAV, and then saves a correspondence between the address identification and the variable identification of each UAV.

The data sending module 330 is further used for sending the UAV data of each UAV to the ground station device via an Ethernet network, so that the ground station device can collectively display the UAV data of each UAV using a display device. Wherein, the UAV data may be UAV flight data, flight attitude and other data.

In this embodiment, after receiving the data sent by each UAV, the server can save a correspondence between the variable identification and the address identification of each UAV, so as to identify the address identification according to the variable identification contained in each UAV control instruction when receiving a plurality of UAV control instructions sent by a ground station device, and send the control instruction to the corresponding UAV, thus multiple UAVs being controlled by one ground station device can be achieved. In addition, the server forwards the data of each UAV to the ground station device, and the ground station device can collectively display the data of each UAV, facilitating viewing and monitoring by mangers.

Figure 4:
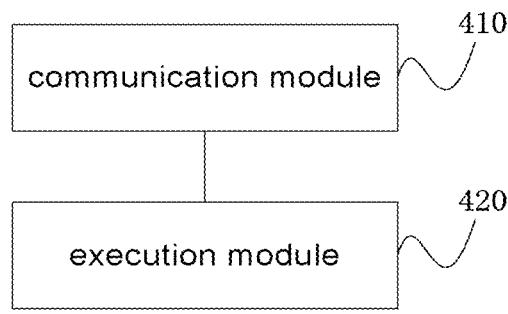
FIG. 4 is a schematic structural diagram of an UAV according to some embodiments of the present disclosure.

FIG. 4 is a schematic structural diagram of an UAV according to some embodiments of the present disclosure. The UAV comprises a communication module 410 and an execution module 420. Wherein, The communication module 410 is used for receiving an UAV control instruction sent by a server via a mobile network. For example, the communication module is a 3G communication module or a 4G communication module. After the server acquires a variable identification in an UAV control instruction, it acquires a source address, namely an address identification of the UAV, and sends the UAV control instruction to the communication module of the UAV via a 3G network or 4G network according to the address identification. Wherein, the UAV communicates with a ground station device using a self-defined protocol. Table 1 shows the various fields contained in a data packet of the self-defined protocol.

The execution module 420 is used for performing an operation corresponding to an UAV control instruction. For example, UAV 1 hovers in the air after receiving a hovering instruction; UAV 2 executes a descending operation after receiving a descending instruction; UAV 3 performs an ascending operation after receiving an ascending instruction.

In this embodiment, after each UAV receives an UAV control instruction sent by the server, it can perform an operation corresponding to the control instruction. Since the UAV is provided with a 3G communication module or a 4G communication module, a plurality of UAVs can directly communicate with the server using a 3G network or a 4G network, thus the one-to-many communication link problem can be solved.

In still some other embodiments of the present disclosure, a communication module 410 is provided in the UAV, wherein the communication module may be a 3G communication module or a 4G communication module, in which an IP address of the server can be bound. A serial port module can be integrated in the communication module to convert serial port data of the UAV into data that can be transmitted via a 3G network or 4G network. Therefore, using the communication module 410, the UAV can send its own data to the server over the 3G network or 4G network. After receiving the data, the server acquires a source address of the UAV and saves a correspondence between the address identification and the variable identification, so that when the ground station device sends a control instruction, the control instruction can be sent to the communication module 410. Further, since an Ethernet network can be accessed by the UAVs through the server, it lays a foundation for the close connection between the UAV industry and the Internet industry.

In this embodiment, providing a communication module in the UAV and binding an IP address of a server, the UAV can send data to the server via a 3G network or 4G network. After receiving a control instruction, the server can send the control instruction to the communication module of a corresponding UAV, thus multiple UAVs being controlled by one ground station device can be achieved. In addition, since the UAV is provided with the communication module and communicates with the server via a 3G network or 4G network, the UAV can still be controlled by one ground station device when the UAV is in an over-the-horizon flight state.

Figure 5:
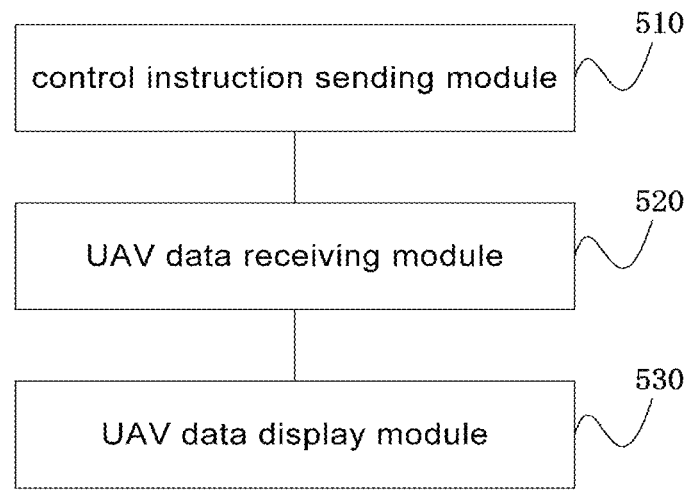
FIG. 5 is a schematic structural diagram of a ground station device according to some embodiments of the present disclosure.

FIG. 5 is a schematic structural diagram of a ground station device according to some embodiments of the present disclosure. The ground station device comprises a control instruction sending module 510 and an UAV data receiving module 520, wherein:

the control command sending module 510 is used for sending a plurality of UAV control instructions to a server, for example, sending a hovering instruction to UAV 1, sending a descending instruction to UAV 2, sending an ascending instruction to UAV 3, etc. Wherein, each UAV control instruction carries a variable identification for identifying an UAV. For example, the ground station device uses a self-defined protocol when communicating with an UAV. A sisId field of the self-defined protocol data packet is an 8-bit variable identification used to identify the model of the UAV. After receiving control instructions via an Ethernet network, for each of the UAV control instructions, the server can acquire an address identification of the corresponding UAV according to the variable identification in the UAV control instruction, and send the corresponding UAV control instruction to the communication module of the UAV corresponding to the address identification via a mobile network, so that the UAV can perform an operation corresponding to the UAV control instruction, wherein the mobile network may be a 3G, 4G or other next generation network.

The UAV data receiving module 520 is used for receiving UAV data sent by the server, wherein the UAV data may be flight data, flight attitude and other data. For example, the ground station device can identify which UAV sent the data according to the variable identification contained in the UAV data, and then be aware of the status of the UAV according to the UAV data.

In some embodiments, the ground station device may further comprise an UAV data display module 530 for collectively displaying the UAV data. For example, flight data of UAV 1, UAV 2 and UAV 3 are displayed simultaneously in one interface.

In the embodiment shown in FIG. 5, the ground station device can communicate with UAVs using a server based on a self-defined protocol, so that multiple UAVs being controlled by one ground station device can be achieved. In addition, since the ground station device communicates with the server via an Ethernet network and the server communicates with the UAVs via a mobile network, the UAVs can still be controlled by the ground station device in the situation of over-the-horizon flight.

Figure 6:
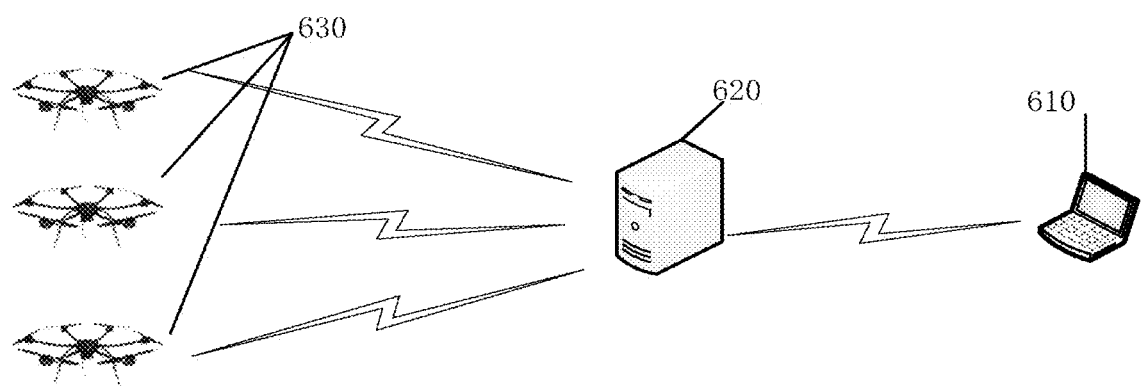
FIG. 6 is a schematic structural diagram of a system for controlling UAV according to some embodiments of the present disclosure.

FIG. 6 is a schematic structural diagram of a system for controlling UAV according to some embodiments of the present disclosure. The system for controlling UAV comprises a ground station device 610, a server 620 and a plurality of UAVs 630, wherein the ground station device 610, the server 620 and the UAVs 630 have been described in detail in some embodiments and will not be further explained here.

The ground station device 610 communicates with the UAVs 630 through the server 620 based on a self-defined protocol, wherein the fields contained in the custom data packet are shown in Table 1. Messages sent by the ground station device 610 and the UAVs 630 comprise variable identifications used to identify the UAVs. The server 620 realizes data forwarding, storage and parsing of some data, etc. Therefore, multiple UAVs being controlled by one ground station device can be achieved. In addition, the ground station device 610 communicates with the server 620 via an Ethernet network, and the server 620 is connected to a mobile network via an Internet network to further communicate with the UAVs 630. Therefore, the UAVs can still be controlled by the ground station device in the situation of over-the-horizon flight. Further, since an Ethernet network can be accessed by UAVs 630 through the server 620, it lays a foundation for the close connection between the UAV industry and the Internet industry.

Figure 7:
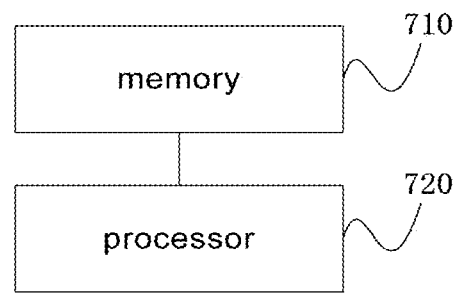
FIG. 7 is a schematic structural diagram of a system for controlling UAV according to some other embodiments of the present disclosure.

FIG. 7 is a schematic structural diagram of a server of a system for controlling UAV according to still some other embodiments of the present disclosure. The server comprises a memory 710 and a processor 720. Wherein:

the memory 710 may be a magnetic disk, flash memory or any other non-volatile storage medium. The memory is used for storing instructions of corresponding embodiments shown in FIGS. 1-2.

The processor 720 is coupled to memory 710 and may be implemented as one or more integrated circuits, such as a microprocessor or microcontroller. The processor 720 is used for executing the instructions stored in the memory and can achieve the control of multiple UAVs by one ground station device.

In some other embodiments of the present disclosure, the UAV can also comprise the memory 710 and the processor 720, wherein the memory 710 is used for storing instructions of the communication module 410 and the execution module 420 shown in FIG. 4.

In some other embodiments of the present disclosure, the ground station device can also comprise the memory 710 and the processor 720, wherein the memory 710 is used for storing instructions of the control instruction sending module 510 and the UAV data receiving module 520 shown in FIG. 5.

Figure 8:
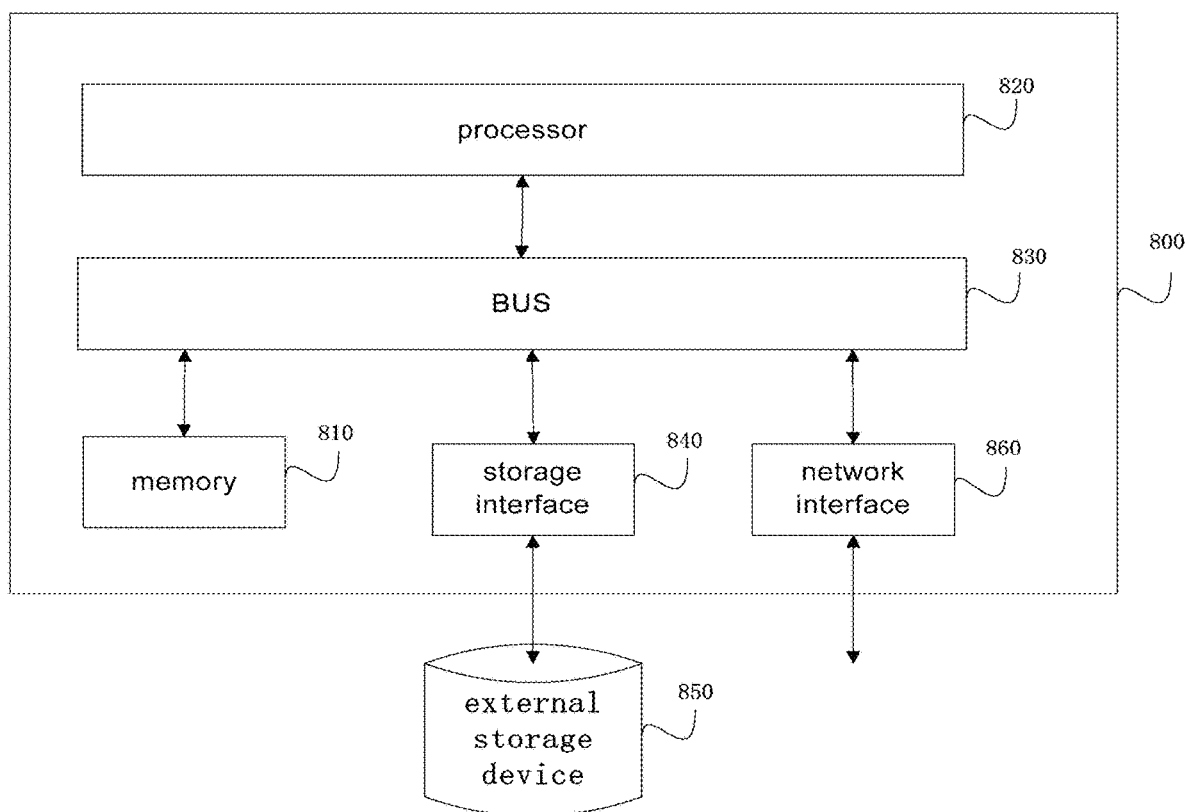
FIG. 8 is a schematic structural diagram of a system for controlling UAV according to still some other embodiments of the present disclosure.

In some other embodiments, as also shown in FIG. 8, a server, an UAV or a ground station device 800 comprises a memory 810 and a processor 820. The processor 820 is coupled to the memory 810 via a BUS 830. The server, the UAV or the ground station device 800 may be further connected to an external storage device 850 through a storage interface 840 to access external data, and may be further connected to a network or another computer system (not shown) via a network interface 860. The details of which will not described herein.

In this embodiment, the ground station device sends control instructions to multiple UAVs using a server based on a self-defined protocol, and the UAVs execute operations according to the control instructions, so as to achieve the control of multiple UAVs by one ground station device. In addition, the UAVs communicate with the server via a 3G network, and the server communicates with the ground station via an Ethernet network, so that the UAVs can still be controlled by the ground station device in the situation of over-the-horizon flight.

In still some other embodiments, there is provided a computer-readable storage medium having computer program instructions stored thereon that, when executed by a processor, implement the steps of the methods of corresponding embodiments shown in FIGS. 1-2. One skilled in the art should understand that, the embodiments of the present disclosure may be provided as a method, an apparatus, or a computer program product. Therefore, embodiments of this disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure has been described with reference to flow charts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, the present disclosure has been described in detail. In order to avoid obscuring the concepts of the present disclosure, some details known in the art are not described. Based on the above description, those skilled in the art can understand how to implement the technical solutions disclosed herein.

The method and apparatus of the present disclosure may be implemented in many ways. For example, the method and apparatus of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which include machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the present disclosure is defined by the following claims.

What is claimed is:

1. A method for controlling an unmanned aerial vehicle (UAV), comprising:

receiving, by a server, one or more UAV control instructions sent by a ground station device, wherein each UAV control instruction comprises a variable identification for identifying an UAV;

acquiring, by the server, for each of the UAV control instructions, an address identification of a corresponding UAV according to the variable identification in the UAV control instruction, and sending the corresponding UAV control instruction to a communication module of the UAV corresponding to the address identification via a mobile network, so that the UAV executes an operation corresponding to the received UAV control instruction;

sending, by the server, UAV data to the ground station device, so that the ground station device collectively displays the UAV data using a display device, wherein the UAV data comprises the variable identification for identifying the UAV; and saving, by the server, a correspondence between the variable identification and the address identification of each UAV, so as to acquire corresponding address identification according to each variable identification when receiving a plurality of UAV control instructions, and send the plurality of UAV control instructions respectively to the communication module of UAV corresponding to each address identification.

2. The method according to claim 1, further comprising:
receiving, by the server, the UAV data sent by the communication module of each UAV via the mobile network; and
sending, by the server, the UAV data to the ground station device, so that the ground station device identifies the UAV data according to the variable identification.

3. The method according to claim 2,
wherein the mobile network is a 3G network and/or 4G network;
receiving, by the server, the UAV data sent by the communication module of each UAV via the mobile network comprises: and
receiving, via the Internet by the server, the UAV data sent by the communication module of each UAV via the 3G network and/or 4G network, and
the communication module of the UAV converts serial port data of the UAV into UAV data transmitted via 3G network and/or 4G network.

4. A server, comprising:
memory; and
a processor coupled to the memory, which is configured to execute a method for controlling an unmanned aerial vehicle (UAV) for performing operations on a basis of instructions stored in the memory, comprising:
receiving one or more UAV control instructions sent by a ground station device, wherein each UAV control instruction comprises a variable identification for identifying an UAV;
for each of the UAV control instructions, acquiring an address identification of a corresponding UAV according to the variable identification in the UAV control instruction, and sending the corresponding UAV control instruction to a communication module of the UAV corresponding to the address identification via a mobile network, so that the UAV executes an operation corresponding to the received UAV control instruction;
sending UAV data to the ground station device, so that the ground station device collectively displays the UAV data using a display device, wherein the UAV data comprises the variable identification for identifying the UAV; and
saving a correspondence between the variable identification and the address identification of each UAV, so as to acquire corresponding address identification according to each variable identification when receiving a plurality of UAV control instructions, and send the plurality of UAV control instructions respectively to the communication module of UAV corresponding to each address identification.

5. A non-transitory computer-readable storage medium on which computer program instructions are stored, which when executed by a processor implement the steps of the method according to claim 1.

6. The server according to claim 4, wherein the operations further comprise:
receiving the UAV data sent by the communication module of each UAV via the mobile network; and
sending the UAV data to the ground station device, so that the ground station es the UAV data according to the variable identification.

7. The server according to claim 6,
wherein the mobile network is a 3G network and/or 4G network;
the operation further comprise receiving the UAV data sent by the communication module of each UAV via the 3G network and/or 4G network; and
the communication module of the UAV converts serial port data of the UAV into UAV data transmitted via 3G network and/or 4G network.

8. An unmanned aerial vehicle (UAV),
comprising: memory; and
a processor coupled to the memory, which is configured to execute a method for controlling the UAV for performing operations on a basis of instructions stored in the memory, comprising:
receiving an UAV control instruction sent by a server via a mobile network, wherein the UAV control instruction comprises a variable identification for identifying the UAV, the server acquires an address identification of a corresponding UAV according to the variable identification and sends the UAV control instruction according to the address identification of the UAV; and
executing an operation corresponding to the UAV control instruction, wherein
the server sends UAV data to a ground station device, so that the ground station device collectively displays the UAV data using a display device, wherein the UAV data comprises the variable identification for identifying the UAV, and
the sever saves a correspondence between the variable identification and the address identification of each UAV, so as to acquire corresponding address identification according to each variable identification when receiving a plurality of UAV control instructions, and send the plurality of UAV control instructions respectively to the communication module of UAV corresponding to each address identification.

9. The UAV according to claim 8, wherein the operations further comprise:
sending the UAV data to the server via the mobile network, so that the server sends UAV data to the ground station device.

10. The UAV according to claim 8, wherein the operations further comprise:
converting serial port data of the UAV into UAV data transmitted via 3G network and/or 4G network, and
sending the UAV data to the server via a 3G network and/or 4G network.

11. A system for controlling UAV,
comprising: the server according to claim 4;
the UAV, wherein the UAV
comprises: memory, and
a processor coupled to the memory, which is configured to execute a method for controlling the UAV for performing operations on a basis of instructions stored in the memory, comprising:
receiving the UAV control instruction sent by the server via a the mobile network, and
executing an operation corresponding to the UAV control instruction;
and the ground station device for sending the one or more UAV control instructions to the server.

12. The computer-readable storage medium according to claim 5, wherein the method further comprises:
receiving the UAV data sent by the communication module of each UAV via the mobile network; and
sending the UAV data to the ground station device, so that the ground station device identifies the UAV data according to the variable identification.

13. The computer-readable storage medium according to claim 12,
the mobile network is a 3G network and/or 4G network;
the method further comprises receiving the UAV data sent by the communication module of each UAV via the 3G network and/or 4G network, wherein; and the communication module of the UAV converts serial port data of the UAV into UAV data transmitted via 3G network and/or 4G network.

* * * * *

UNITED STATES PATENT AND TRADEMARK OFFICE
CERTIFICATE OF CORRECTION

| | |
|---|---|
| PATENT NO. | : 10,996,684 B2 |
| APPLICATION NO. | : 16/334534 |
| DATED | : May 4, 2021 |
| INVENTOR(S) | : Ying Li |

It is certified that error appears in the above-identified patent and that said Letters Patent is hereby corrected as shown below:

On the Title Page

Item (73), the Assignee's name is incorrect. Item (73) should read:
-- (73) Assignee: BEIJING JINGDONG QIANSHI TECHNOLOGY CO., LTD., Beijing (CN) --

Signed and Sealed this
Seventh Day of June, 2022

Katherine Kelly Vidal
*Director of the United States Patent and Trademark Office*